No. 666,962. Patented Jan. 29, 1901.
T. GIBSON & J. McGRATH.
SLED.
(Application filed Nov. 30, 1900.)
(No Model.)
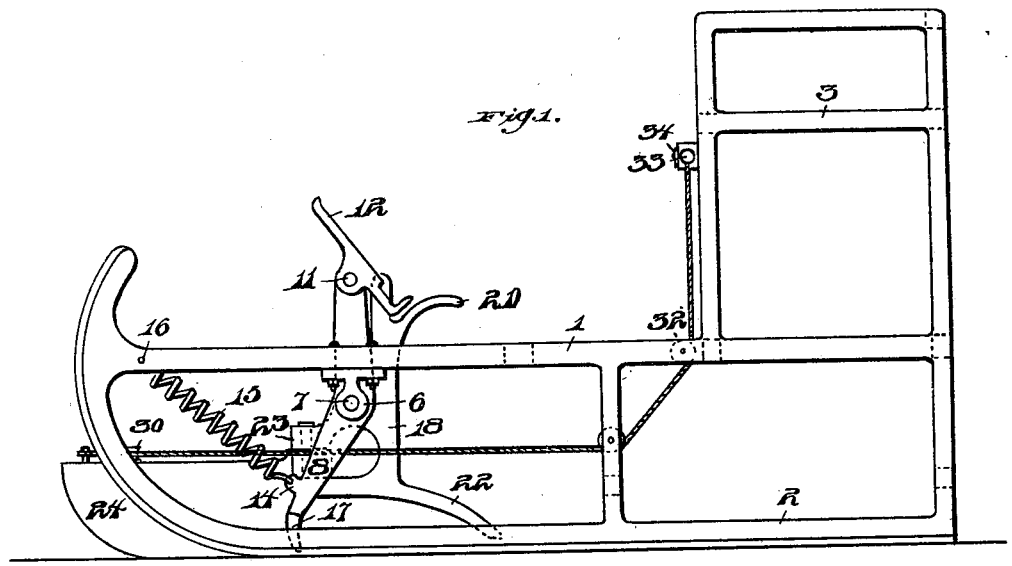
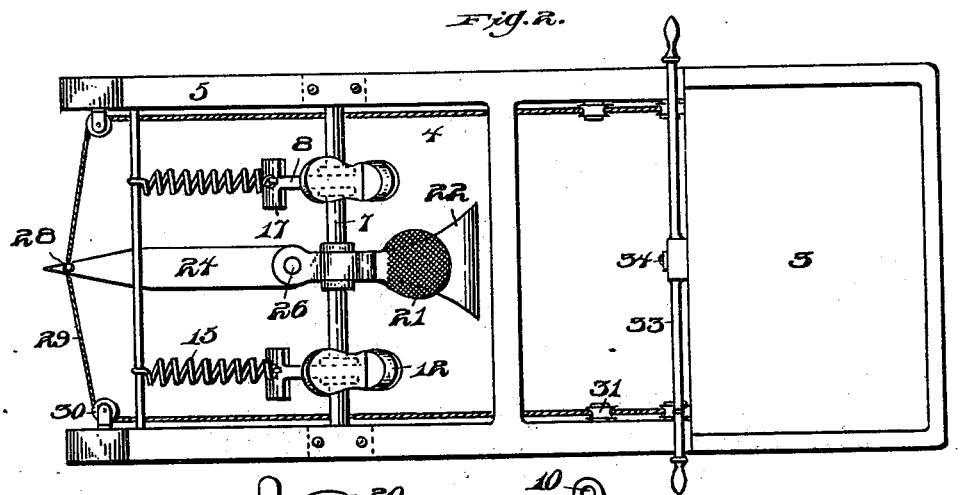
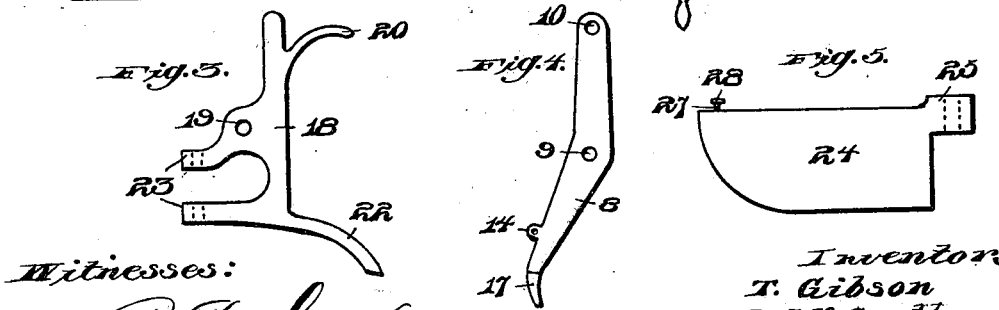
Witnesses:
Inventors
T. Gibson
J. McGrath

UNITED STATES PATENT OFFICE.

THOMAS GIBSON AND JAMES McGRATH, OF BRADDOCK, PENNSYLVANIA.

SLED.

SPECIFICATION forming part of Letters Patent No. 666,962, dated January 29, 1901.

Application filed November 30, 1900. Serial No. 38,155. (No model.)

*To all whom it may concern:*

Be it known that we, THOMAS GIBSON and JAMES McGRATH, citizens of the United States of America, residing at Braddock, in the county of Allegheny and State of Pennsylvania, have invented certain new and useful Improvements in Foot - Propellers, Brakes, and Steering Apparatus for Sleds and Sleighs, of which the following is a specification, reference being had therein to the accompanying drawings.

This invention relates to certain new and useful improvements in sleds and sleighs, and more particularly to the foot propelling mechanism, brake, and steering apparatus for the same.

The invention has for its object the provision of novel means whereby a sled or sleigh may be easily propelled, the brake applied, and the steering apparatus handled with perfect safety in a convenient manner.

The invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a side elevation of our improved sled or sleigh. Fig. 2 is a top plan view thereof. Fig. 3 is a side elevation of the bracket forming the brake and carrying the steering mechanism. Fig. 4 is a side elevation of one of the fingers for the propulsion of the apparatus. Fig. 5 is a side elevation of a portion of the steering mechanism.

In the drawings the reference-numeral 1 indicates the body portion of the sled or sleigh, which may be of any desired construction, having the usual runners 2 and seat 3. The forward portion of the sled or sleigh is cut away, as shown at 4, forming the sides 5. On the under face of said sides are arranged hangers 6, carrying a stationary shaft 7, upon which are mounted fingers 8, having formed therein a central opening 9, through which said shaft 7 passes, and an opening 10 is formed at the upper portion thereof for the reception of a pin 11, serving as fastening means for the treadle 12. The said fingers are further provided near their lower extremity with apertured lugs 14, to which are secured spiral springs 15, the other ends of which are secured to the shaft 16, connecting the sides of the sled together near the forward portion thereof. The lower extremity of the said fingers carries engaging points 17. Upon the said shaft 7 is also mounted a hanger 18, and said shaft passes through the opening 19, formed in said hanger, this hanger being formed with an upper curved head 20, said curved head being formed on its upper face with a rough surface 21. The lower end of said hanger carries a curved shoe 22, the latter acting as a brake when desired. The forward portion of the hanger carries apertured lugs 23, in which is pivotally secured a movable runner 24, said runner being rearwardly provided with an apertured lug 25, which is adapted to register with the apertured lugs 23, a pin 26 serving to pivotally secure these parts together. On the upper forward portion of the movable runner 24 is secured a pin 27, having a head 28, to which is securely fastened a guide-rope 29, said guide-rope passing over pulleys 30, arranged to the inner sides of the sled next the forward portion thereof, and passing rearwardly over pulleys 31, which are likewise arranged to the inner sides of the sled. Pulleys 32 are also arranged on each side of the sled, the guide-rope 29 passing over the same upwardly, the ends of said guide-rope being connected at each end to a swiveled lever 33, which is pivotally secured at 34 to the body portion of the sled.

The operation of our improved sled is as follows: The operator, being seated in the sled, will place his feet in the treadles, operating the same alternately by thrusting the same to the forward position, thereby forcing the engaging points of the fingers into the snow or ice and propelling the apparatus, the springs 15 serving to return the fingers to their normal position. In case it is desired to apply the brake the foot may be removed from the treadle and applied to the curved head 20, thereby applying the brake-shoe, the engaging end of which will act as a brake. When the latter is released, this operation of the mechanism will be returned to its normal position by reason of the steering-runner acting as a balance. The steering-runner is operated by means of the swiveled lever being operated downwardly on one side or the other, as the case may be, thereby tightening or loosening the sections and the operating-rope for the purpose of moving the steering-runner in one direction or the other.

The many advantages of our improved sled will be readily understood from the foregoing description, taken in connection with the accompanying drawings.

It will be noted that various changes may be made in the details of construction without departing from the general spirit of our invention.

Having thus fully described our invention, what we claim as new, and desire to secure by Letters Patent, is—

1. In a sled, the combination of pivotally-mounted fingers, treadles connected to said fingers, springs secured to said fingers adapted to return the same to their normal position, a guide-runner, an operating-cord connected to said guide-runner, and means to operate said cord, substantially as described.

2. In a sled, the combination of a shaft, fingers pivotally mounted on said shaft, treadles pivotally connected to said shaft, springs connected to said fingers adapted to return the same to their normal position, a hanger mounted on said shaft, a shoe secured to the lower end of said hanger, a guide-runner pivotally arranged in said hanger, an operating-cord fastened to said guide-runner, and a swiveled lever adapted to be attached to the end of said operating-cord, substantially as described.

In testimony whereof we affix our signatures in the presence of two witnesses.

THOMAS GIBSON.
JAMES McGRATH.

Witnesses:
JOHN NOLAND,
E. E. POTTER.